Jan. 17, 1939.  M. M. SAFFORD  2,144,548
METHOD OF MAKING AND CURING RESIN FILMS
Filed Aug. 31, 1935

Inventor:
Moyer M. Safford,
by Harry E. Dunham
His Attorney.

Patented Jan. 17, 1939

2,144,548

UNITED STATES PATENT OFFICE 2,144,548

METHOD OF MAKING AND CURING RESIN FILMS

Moyer M. Safford, Schenectady, N. Y., assignor to General Electric Company, a corporation of New York Application August 31, 1935, Serial No. 38,767

2 Claims. (Cl. 18—57)

The present invention relates broadly to a method of making and curing or hardening resin films. It is particularly directed to the production of continuous, smooth film from resins of the alkyd type.

Heretofore, alkyd resin films for the most part have been made by revolving a cylindrical drum in a trough containing liquid resin. This particular method does not give a continuous film, the length being limited by the diameter of the drum. Moreover, the alkyd resin films made by this procedure, due to the method of applying the resin on the drum, are frequently beady and wavy. Trouble is also encountered frequently in obtaining a film of the desired thickness.

In accordance with my invention uncured alkyd resin is sprayed in a very thin film on a revolving continuous metal belt partially enclosed in electrically heated ovens or towers. The passage of the resin-coated belt through the heated towers subjects both the coated and uncoated sides of the belt to radiant heat, and sufficiently sets or cures the resin so that it may be stripped from the belt. If a thicker film is needed the belt may be subjected to several spraying and heating treatments, the resin film being stripped from the belt when the desired thickness is obtained. The stripped partially cured resin film may be festooned in ovens for a complete cure, or interspersed with cloth and then cured in an electrical oven. If desired, the resin may be completely cured or converted while on the revolving belt to a hard, infusible state.

Figure 1:
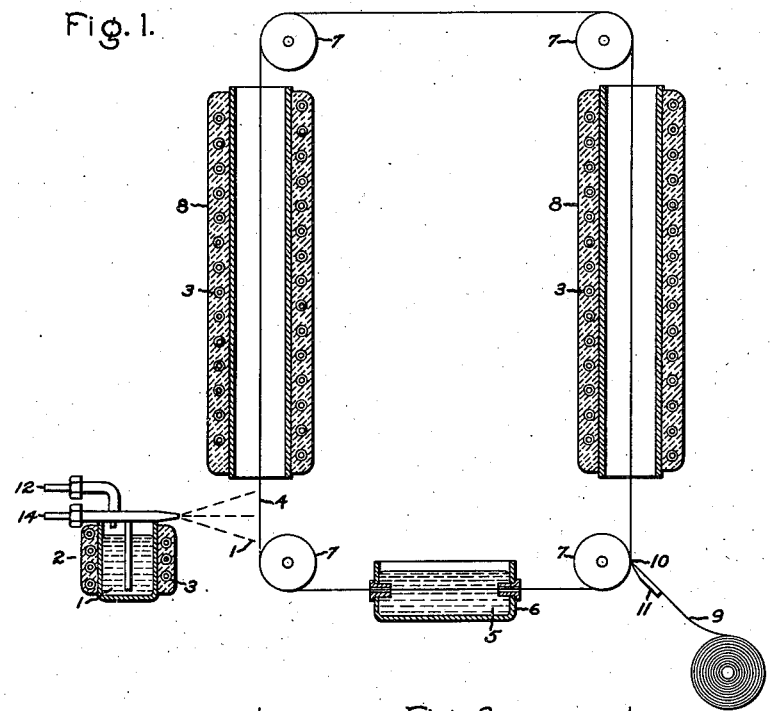
Figure 2:
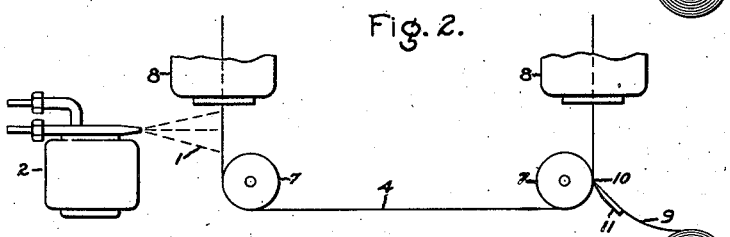
Figure 3:
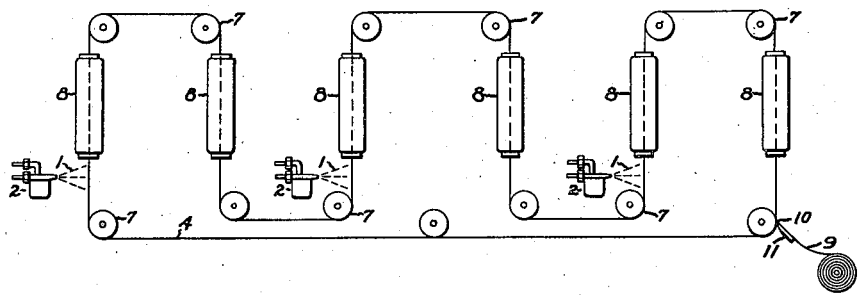

For an understanding of my invention, reference is made to the following description taken in connection with the accompanying drawing, in which Fig. 1 is a diagrammatic elevational view, partly in section, of a preferred form of apparatus for carrying out my invention; Fig. 2 is a fragmentary elevational view of a modified form of the apparatus shown in Fig. 1; and Fig. 3 is an elevational view illustrating a further modification of my invention. Like numerals represent like parts throughout the drawing.

Referring to Fig. 1, the alkyd resin 1 is placed in a spray gun 2, heated by electrical heating units 3. The resin is sprayed under pressure so as to form a very thin film on revolving metal belt 4. In order that the resin may be easily stripped from the surface of the metal belt, the latter is first provided with a thin coating of mercury 5, which it picks up as it travels through a bath 6 containing this element. The belt may be made of suitable metal, such as iron, surface-coated with a metal such as zinc or tin.

The belt moves over rollers 7 driven from a suitable source of power (not shown) and passes through the electrically heated chambers or towers 8, two of which are shown in the drawing.

The resin film 9, having been subjected to heat treatment, is stripped from the belt at 10 by a sharp metallic scraper 11, rolled and prepared, if necessary, for complete cure in the usual manner. After the resin film has been removed from the continuous revolving belt 4, the belt is once again passed through the mercury container. The application of this thin layer containing mercury before the application of the resin prevents the resin from adhering permanently to the metal belt.

In the preferred spray gun 2, air pressure is applied above the liquid resin at 12 as well as at the spray jet 14. A spray gun of this type is particularly advantageous when films are being made from viscous material.

Referring now to Figs. 2 and 3. In the modification shown in Fig. 2 the metal belt 4 is composed of chromium-plated iron. When a belt of this composition is used, the mercury coating bath is unnecessary. Fig. 3 shows several resin spray guns along the length of the belt 4 interspersed with electrical ovens 8. The interspersed ovens cure or semi-cure the resin film before the next layer of resin is sprayed on to the belt. By using this modification films of appreciable thickness are obtainable. As shown in Figs. 1, 2, and 3 after spraying the continuously moving belt with liquid resin, the belt with its spray-deposited coating of resin thereon is passed through a heated zone to cure the resin in place on the moving belt, said resin being cured wholly or partly, as may be desired, during its passage through said zone.

My method of making films is particularly adapted for the manufacturer of alkyd resin films. The alkyd resin may be of any preferred composition such for example as disclosed in Kienle Patent 1,893,873, or Kienle and Rohlfs Patent 1,897,260. The resinous compositions disclosed and claimed in these patents are resins of the polyhydric alcohol-polybasic acid class that are modified to impart flexibility to the hardened product, as well as otherwise to improve their useful properties. The product of Kienle Patent No. 1,893,873 is the reaction product of polyhydric alcohol, polybasic aromatic acid and air-drying fatty acid. The product of Kienle and Rohlfs Patent No. 1,897,260 is the reaction product of a polybasic aromatic acid, an alcohol having at least three hydroxyl groups, a dihydric alcohol and a dibasic aliphatic acid. The film properties, of course, vary with the particular resin composition used.

I prefer to spray the alkyd resin when it is in the commonly called liquid (soluble) or A-stage. The spray gun which is heated so as to aid in keeping the resin in a liquid condition should be closed to the atmosphere to prevent premature esterification. Various solutions of the alkyd resin may also be employed.

Films of varying thickness may be made according to my process by controlling the speed of the revolving belt. For example satisfactory films may be prepared having a thickness of about 0.001 inch to about 0.01 inch per spray. Films of great thickness may be prepared by subjecting the cured or partially cured film to subsequent spray treatments.

The smooth alkyd resin films made in accordance with my process may be used in the manufacture of tape, cable insulation, tubing, oil proof gaskets, printers' blankets, printers' type, rollers, movie films, wrapping paper, and the like.

Various obvious modifications of the above methods coming within the true spirit and scope of my invention are meant to be covered in the appended claims.

What I claim as new and desire to secure by Letters Patent of the United States is:

1. A method of making continuous, smooth-surfaced, flexible, cured alkyd-resin film substantially free from beady and wavy characteristics, which method consists in spraying a continuously moving carrier belt, so surfaced as to prevent the applied film from adhering permanently thereto, with a thin film of liquid uncured alkyd resin modified to impart flexibility to the cured resin film, heating said belt and the spray-deposited film of uncured alkyd resin thereon by radiant heat applied to both the film and the side of the belt opposite the film to such a temperature as to convert said resin while in place on said belt to a cured state, and removing the cured resin film from said belt.

2. A method of making continuous, smooth-surfaced, flexible, cured alkyd-resin film substantially free from beady and wavy characteristics, which method consists in spraying a continuously moving carrier belt, so surfaced as to prevent the applied resin from adhering permanently thereto, with several successive applications of thin films of A-stage resinous reaction product of a polybasic aromatic acid, an alcohol having at least three hydroxyl groups, a dihydric alcohol and a dibasic aliphatic acid, the individual films of said reaction product as spray-deposited upon said belt having a thickness of about 0.001 to about 0.01 inch, heating said belt and the spray-deposited film of uncured alkyd resin thereon by radiant heat applied to both the film and the side of the belt opposite the film to such a temperature as to cure said resin while in place on said belt, and stripping the film of cured reaction product from said belt when the desired film thickness has been obtained.

MOYER M. SAFFORD.